United States Patent [19]

Yomogida et al.

[11] Patent Number: 4,510,580
[45] Date of Patent: Apr. 9, 1985

[54] PROGRAMMABLE SEQUENCE CONTROLLER

[75] Inventors: Toshihiko Yomogida, Kariya; Yasuo Suzuki, Ohbu; Kyoji Ito, Aichi, all of Japan

[73] Assignee: Toyoda Koki Kabushiki Kaisha, Kariya, Japan

[21] Appl. No.: 384,763

[22] Filed: Jun. 3, 1982

[30] Foreign Application Priority Data

Jun. 19, 1981 [JP] Japan .................................. 56-95524

[51] Int. Cl.³ .............................................. G06F 3/04
[52] U.S. Cl. .................................................... 364/900
[58] Field of Search ... 364/200 MS File, 900 MS File

[56] References Cited

U.S. PATENT DOCUMENTS 3,944,984  3/1976  Morley et al. ................... 364/200
3,967,104  6/1976  Brantingham ................... 364/900
3,991,404  11/1976  Brioschi et al. .................. 364/200

Primary Examiner—Raulfe B. Zache
Assistant Examiner—David Y. Eng
Attorney, Agent, or Firm—Oblon, Fisher, Spivak, McClelland & Maier

[57] ABSTRACT

A programmable sequence controller using a technique called microprogramming, including a microprogram memory having a plurality of memory sections each storing a set of microinstructions corresponding to the command word of a sequence instruction. The operation code of the sequence instruction is applied to the upper bits of the microprogram memory so as to select one of the memory sections. The remaining bits are determined by a counter and the ON/OFF state of an I/O element so that one of the microinstructions is read out from the selected memory section.

7 Claims, 20 Drawing Figures

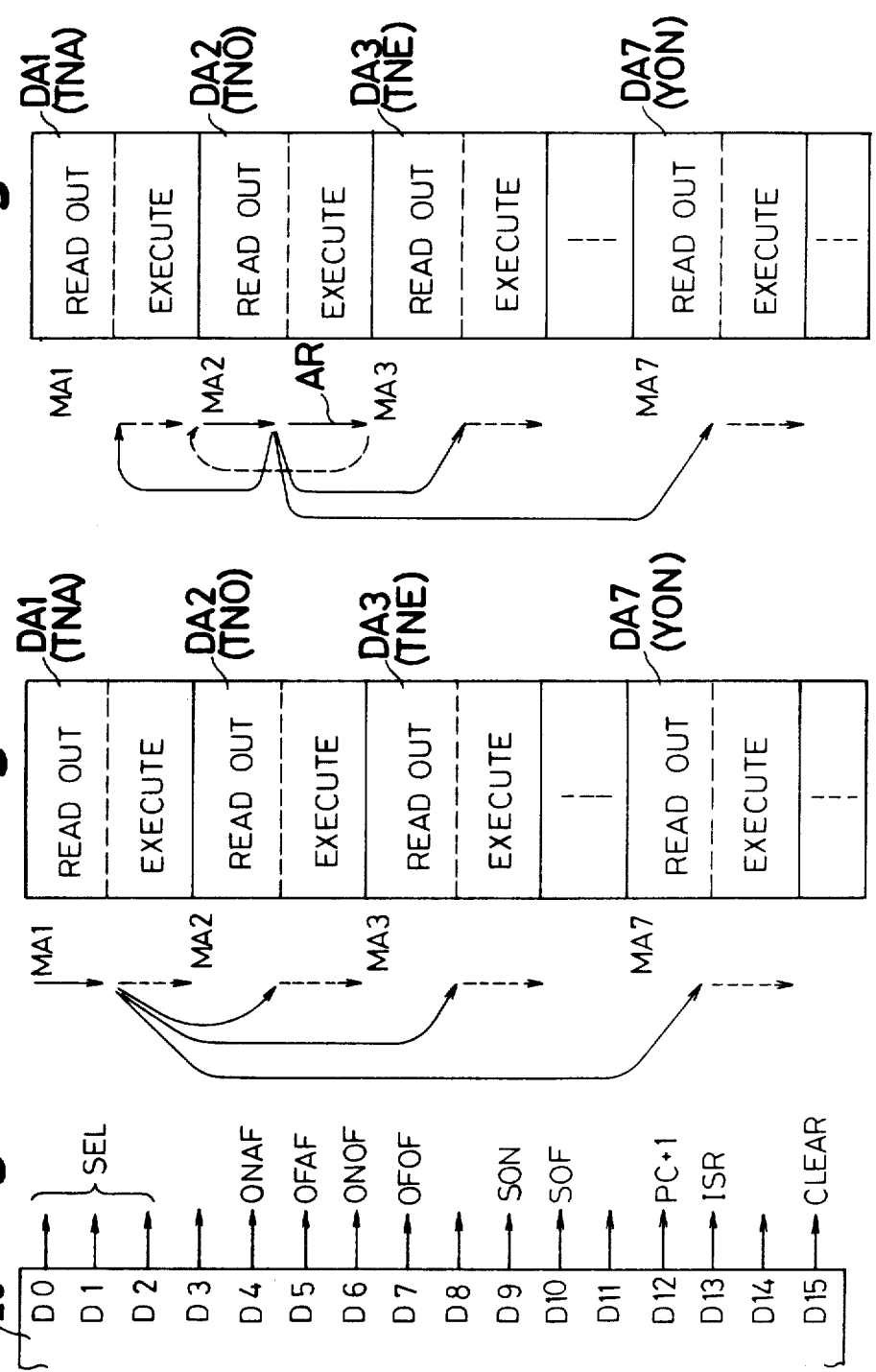

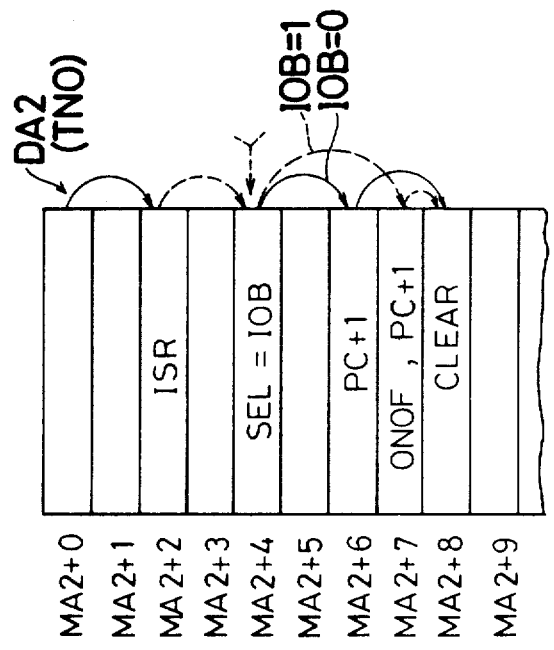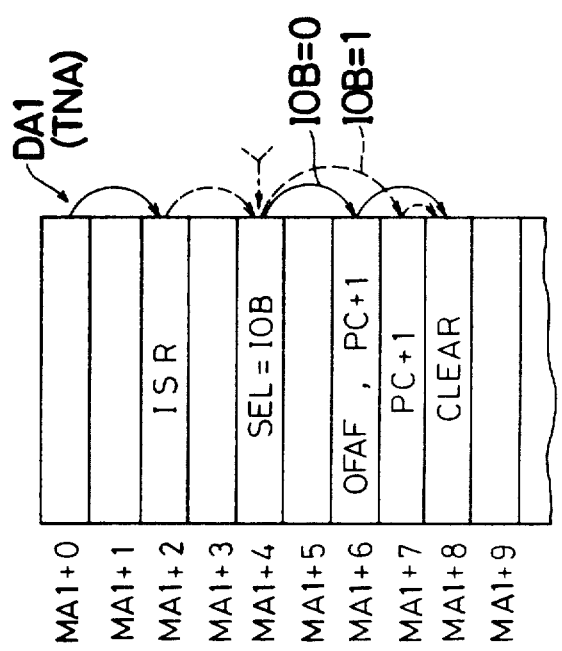

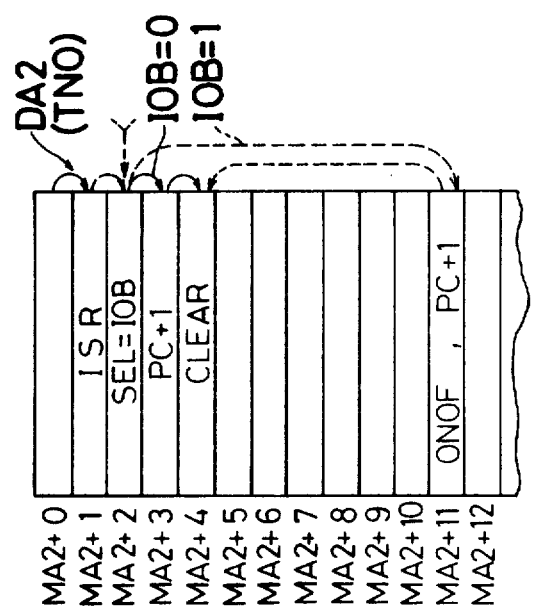
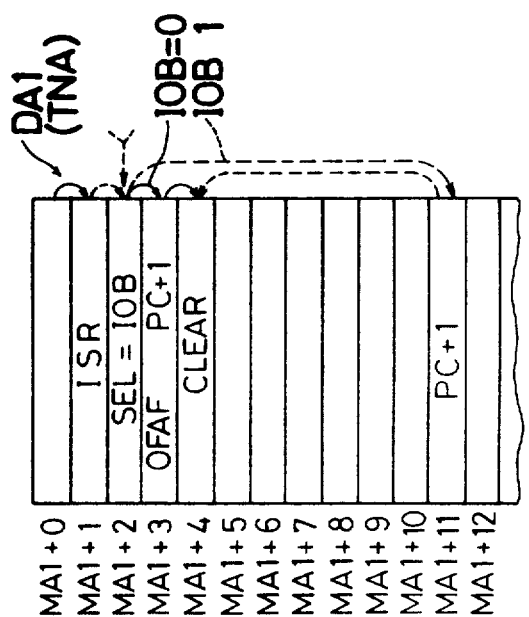

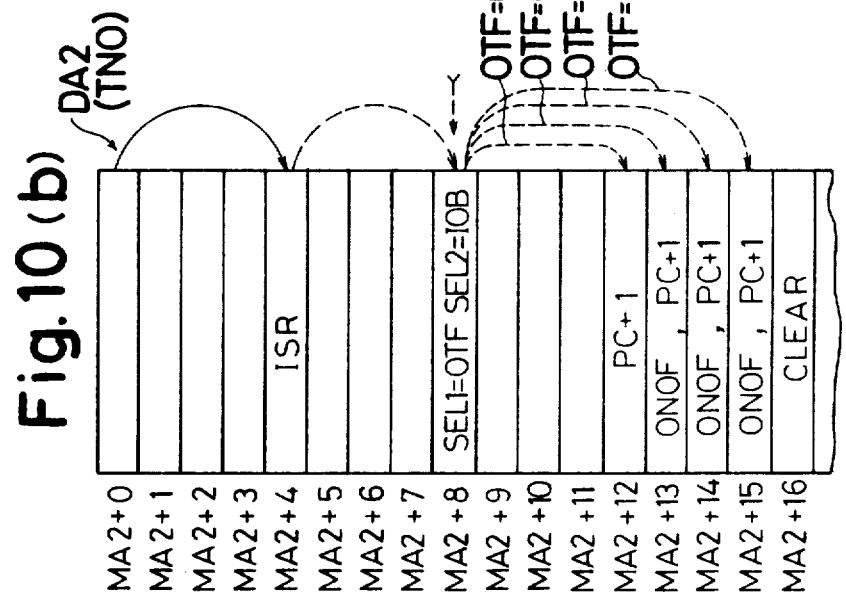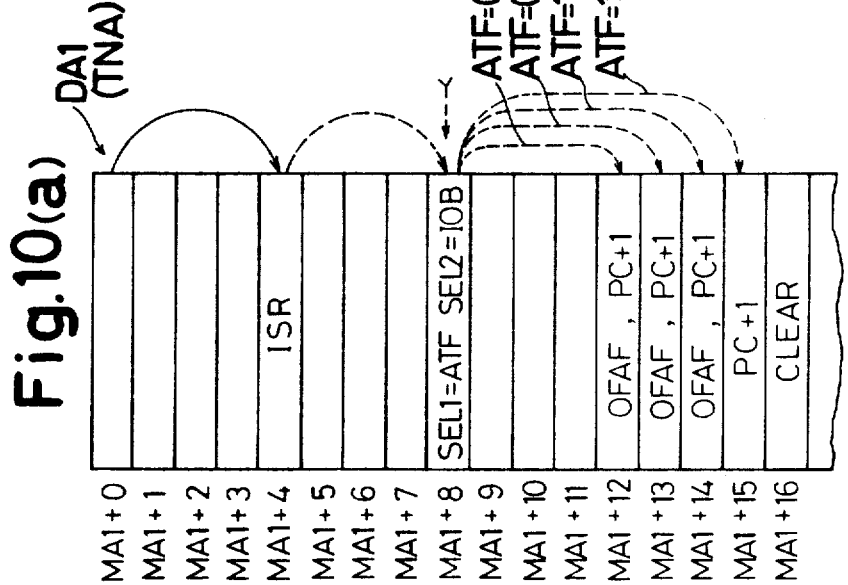

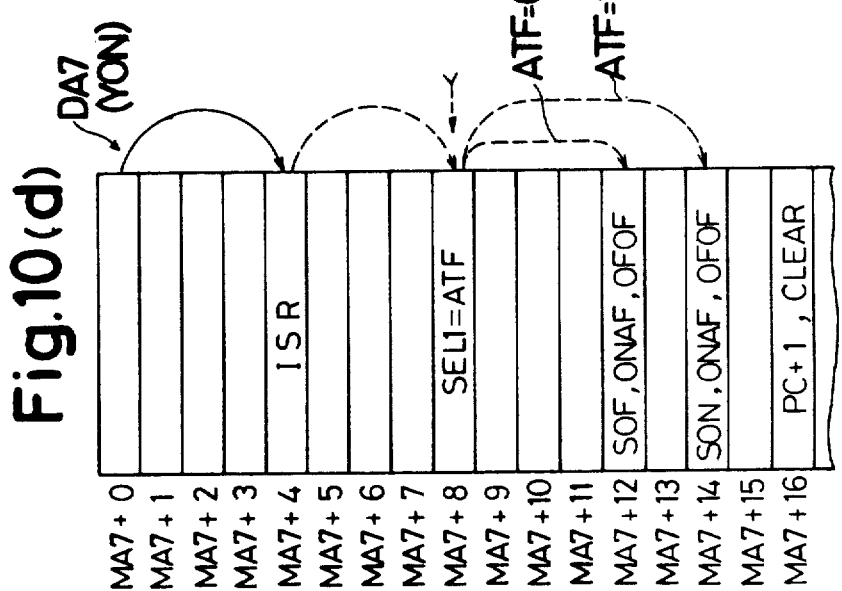
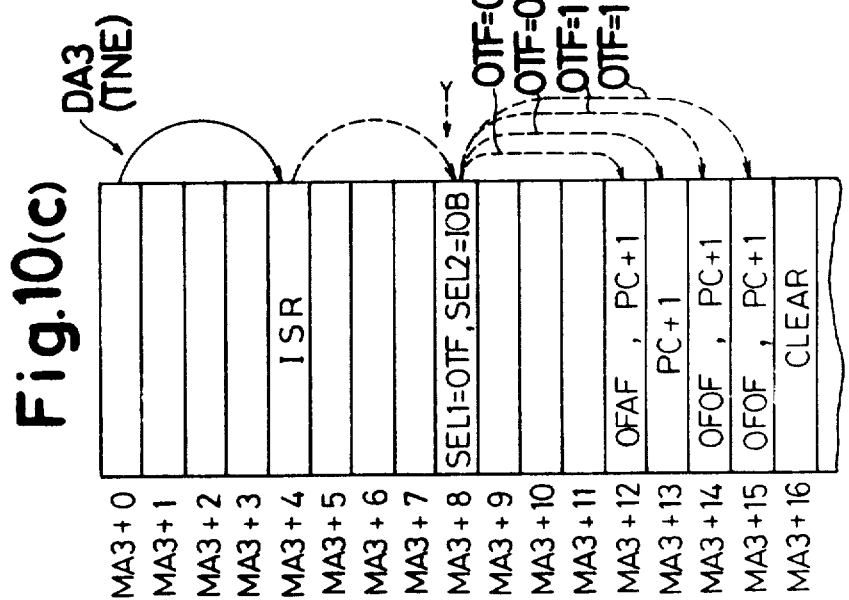

PROGRAMMABLE SEQUENCE CONTROLLER

BACKGROUND OF THE INVENTION

1. Field of the Invention

The present invention relates to a programmable sequence controller using a technique called microprogramming.

2. Description of the Prior Art

In a programmable sequence controller having an operation processing section of the random logic type, the circuits have become complicated.

To minimize this drawback without slowing the execution speed of a sequence program, it has been considered to use a technique called microprogramming in a programmable sequence controller. In such a sequence controller, the operation processing section thereof is generally provided with a memory for storing a microprogram including a plurality of microinstructions, a memory address control unit for designating a memory address of the memory so as to read out a microinstruction therefrom, and a central processing unit (CPU) for performing data processing operations in accordance with the read-out microinstruction. However, since the central processing unit (CPU) which is commercially available is designed for use in a general-purpose computer, it has too many functions to be used in a programmable sequence controller and is relatively expensive. This results in a high cost programmable sequence controller.

Further, it has been suggested to use a commercially available microprogram control unit (MCU) instead of the above-mentioned central processing unit (CPU). In such a system, a sequence control operation is executed by utilizing test flags provided in the microprogram control unit (MCD). More specifically, the test flags are caused to be set or reset in accordance with the data included in the microinstruction and the ON/OFF state of an I/O element, so that the memory address of the memory is designated thereby to read out a microinstruction which is to be executed next. Such a system is disclosed in U.S. Pat. No. 4,249,248. However, the microprogram control unit (MCU) also has excess capabilities, such as various jump functions to alter a designated memory address to a remotely-located memory address, if used in a programmable sequence controller in which the designation of a memory address is carried out rather simply. The microprogram control unit (MCD) is also relatively expensive and, as a result, the programmable sequence controller cannot be built inexpensively.

Furthermore, to overcome the above disadvantages, it is conceivable to use a counter to designate memory addresses, as known in the field of general purpose digital computers. However, sequence control operations cannot be executed if the memory addresses are orderly designated by the counter, because it is necessary to read out the microinstructions from various memory address in accordance with the ON/OFF states of the input and output elements.

SUMMARY OF THE INVENTION

Accordingly, it is a primary object of the present invention to provide an improved programmable sequence controller wherein the ON/OFF state signal of a designated input element is applied to the microprogram memory so as to select and read out a desired microinstruction.

Another object of the present invention is to provide an improved programmable sequence controller which is provided with a counter as a memory address control means so as to designate a desired memory address in cooperation with the ON/OFF state signal of the designated input element.

Briefly, according to the present invention, these and other objects are achieved by providing a programmable sequence controller in which a sequence program memory stores a sequence program composed of a plurality of sequence instructions, each of which sequence instruction includes an operation code for setting forth the type of the sequence instruction and an operand for designating one of input and output elements. A program counter is provided for designating memory addresses of the sequence program memory so as to read out therefrom the sequence instructions. An input and output circuit section, which is responsive to the operand of the sequence instruction read out from the sequence program memory, is provided for reading out the ON/OFF state of one of the input and output elements designated by the operand of sequence instruction. An operation processing unit is connected to the sequence program memory for executing a series of sequence control operations in accordance with the sequence program.

The operation processing unit includes a microprogram memory which stores a microprogram composed of a plurality of microinstructions, and has a plurality of memory areas each having a memory address and storing one of said microinstructions; a counter incrementally actuated for supplying the content thereof to the microprogram memory to decide a portion of the memory address thereof; test flag means responsive to one of the microinstructions read out from the microprogram memory for changing the status thereof; memory address supplying means responsive to one of the microinstructions read out from the microprogram memory for outputting to the microprogram memory a signal whose status depends on either the ON/OFF state from the input and output circuit section or the status of the test flag means, whereby the memory address of the microprogram memory is decided by the operation code of the sequence instruction, the content of the counter and the signal from the memory address supplying means, and one of the microinstructions is output from the memory area having the decided memory address.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 2 is an explanatory representation of a microinstruction which is stored in a microprogram memory shown in FIG. 1;

FIGS. 3(a) and 3(b) are representations of memory sections in the microprogram memory shown in FIG. 1;

FIGS. 4(a) through 4(d) are representations of the details of each memory section shown in FIGS. 3(a) and 3(b);

FIGS. 8(a) through 8(d) are representations of the details of each memory section in a microprogram memory shown in FIG. 7;

FIG. 10(a) through 10(d) are representations of the details of each memory section in a microprogram memory shown in FIG. 9.

DETAILED DESCRIPTION OF THE PREFERRED EMBODIMENTS

Figure 1:
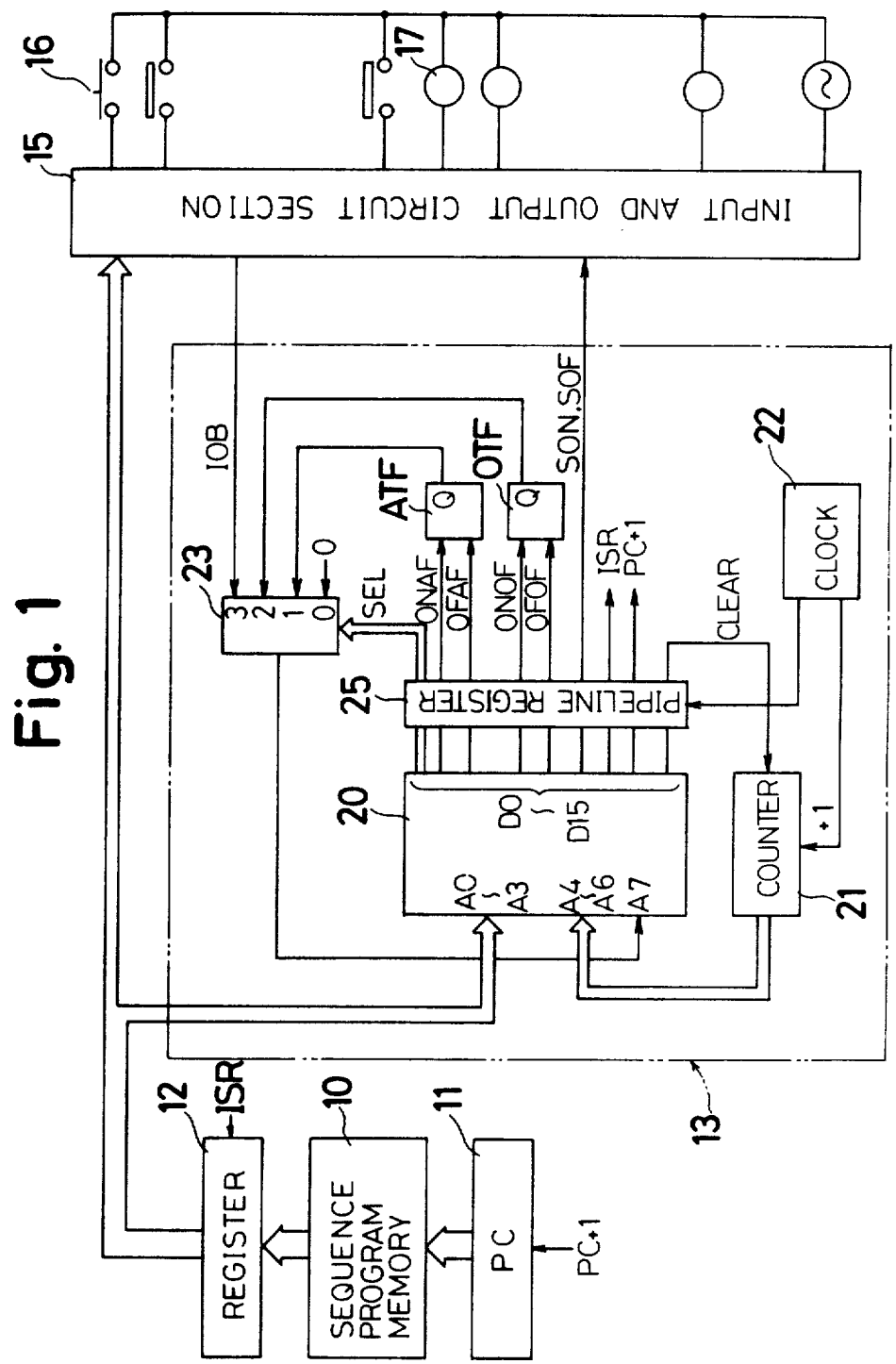
FIG. 1 is a block diagram of a first embodiment of a programmable sequence controller according to the present invention.
Figure 4D:
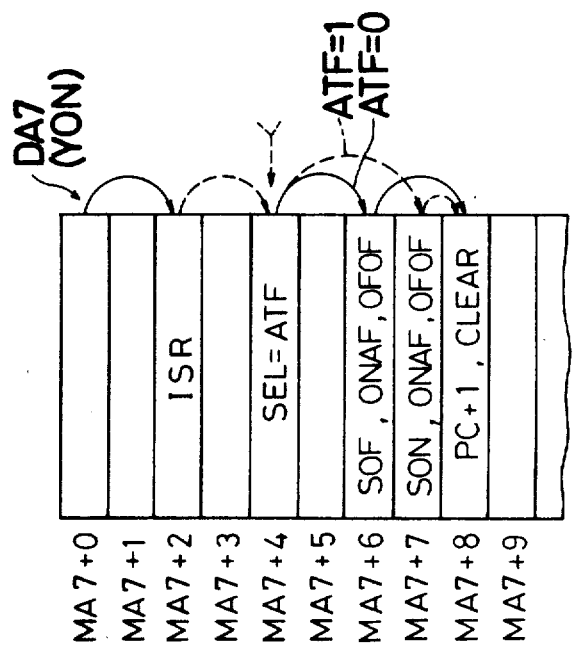
Figure 4C:
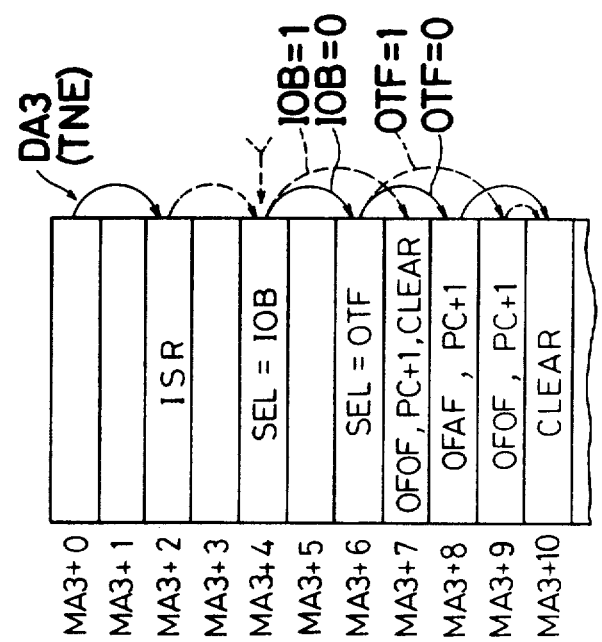

Referring now to the drawings, wherein like reference numerals or characters refer to identical or corresponding parts throughout the several views, and more particularly to FIG. 1, a programmable sequence controller according to the present invention is illustrated, wherein the various elements are shown as blocks. Reference numeral 10 denotes a sequence program memory for storing a sequence program including a plurality of sequence instructions. A program counter 11 is connected to the sequence program memory 10 so as to designate memory addresses thereof. A register 12 is connected to the sequence program memory 10 so as temporarily to store a sequence instruction read out therefrom until the next sequence instruction is read out. The register 12, the sequence program memory 10 and the program counter 11 are connected to a processing unit 13 and an input and output circuit section 15. The processing unit 13 executes a series of sequence control operations in accordance with the sequence program stored in the sequence program memory 10. The input and output circuit section 15 communicates with input elements 16, such as limit switches, and with output elements 17, such as relays.

In this embodiment, each sequence instruction of the sequence program is composed of 16 bits. The upper four bits are used as an operation code for indicating the type of sequence control operation and are transmitted to the processing unit 13. The lower 12 bits are used as an operand for indicating an I/O address and are transmitted to the input and output circuit section 15 so as to select one of the input and output elements 16 and 17.

The processing unit 13 includes a microprogram memory 20 which stores a microprogram, referred to later, and a counter 21 connected to the microprogram memory 20 and constructed from a 3-bit binary counter. The counter 21 is incrementally actuated by clock pulses generated by a clock generating circuit 22 so as to count in an upward direction at regular time interval. Test flags ATF and OTF which are constructed from flip-flops are connected to the microprogram memory 20 through a pipeline register 25 and caused to be set or reset by control signals output from the microprogram memory 20. This allows these test flags ATF and OTF to store an intermediate test result of AND and OR tests during the execution of sequence control operations. The pipeline register 25 is provided for maintaining the control signals until the next control signals are output from the microprogram memory 20. A data selector 23 is capable of selecting one of the signals applied from the input and output circuit section 15 and from output terminals Q of the test flags ATF and OTF in accordance with a data selection signal SEL applied from the microprogram memory 20.

The microprogram includes microinstructions which bring the sequence instructions into the processing unit 13 from the sequence program memory 10 and execute them by transmitting data over the various data paths of the processing unit 13. The microprogram memory 20 has 256 memory areas. Each memory area has a memory address composed of eight bits A0 through A7 and is capable of storing a microinstruction composed of a 16-bit word. The microprogram memory 20 can be constructed from two interconnected read-only memories (ROM) each having 256 8-bit registers. As shown in FIG. 2, each bit D0 through D15 of the microinstruction is assigned to output one of the control signals. Three bits D0, D1 and D2 are employed to output the data selection signal SEL to the data selector 23. Four bits D4 through D7 are employed to output set and reset signals ONAF, OFAF, ONOF and OFOF so as to set or reset the test flags ATF and OTF; and two bits D9 and D10 are employed to output energizing and de-energizing signals SON and SOF to the input and output circuit section 15 so as to turn on and off the output elements 17. One bit D12 is employed to output a signal PC+1 so as to increment the program counter PC by one count. One bit D13 is employed to output a signal ISR so as to read out from the sequence program memory 10 a sequence instruction which is designated by the program counter 11. The final bit D15 is employed to output a clear signal CLEAR so as to clear or reset the counter 21. A desired one of the control signals is output, if the corresponding bit indicates "1". For example, if the microcontrol instruction is 0000 1000 0000 0000, the control signal ONAF is output.

The memory areas of the microprogram memory 20 are divided into 16 memory sections DA1 through DA16, as shown in FIGS. 3(a) and 3(b). Each memory section DA1 through DA16 is capable of storing up to 16 microinstructions and stores at the beginning portion thereof the microinstructions to execute the sequence control operations in accordance with the sequence instruction.

When the sequence instruction is read out in response to the control signal ISR, the 4-bit operation code thereof is applied to the upper four bits A0 through A3 of the microprogram memory 20. The next three bits A4, A5 and A6 are decided by the 3-bit counter 21 and the final bit A7 is decided by a signal from the data selector 23. Accordingly, one of the memory sections DA1 through DA16 is selected by the operation code of the sequence instruction, and one of the memory areas storing therein the microinstruction is selected from the selected memory section by the counter 21 and the signal from the data selector 23. Since the final bit A7 is decided by the signal from the data selector 23, if the data selector 23 outputs the signal "0", an even memory address is designated, and if the signal "1" is applied, an odd memory address is designated.

Each of the memory sections DA1 through DA16 is assigned to execute a specific one of the sequence control operations. In this example, the memory sections DA1, DA2, DA3 and DA7 correspond to command words TNA, TNO, TNE and YON, respectively. The following TABLE shows the command words TNA, TNO, TNE and YON with their 4-bit operation codes and meaning setting forth their sequence control operations.

TABLE

| Command Word | Operation Code | Meaning |
|---|---|---|
| TNA | 0001 | Test whether a designated I/O element is ON and obtain a test result ANDed with a previous test result. |
| TNO | 0010 | Test whether a designated I/O element is ON and obtain a test result ORed with a previous test result. |
| TNE | 0011 | Test whether a designated I/O element is ON, obtain a test result ORed with a previous test result, and incorporate the test result into a previous AND test result. |
| YON | 0111 | Energize a designated output element if the test flag indicates satisfaction, or de-energize the designated output element if the test flag indicates non-satisfaction. |

The microinstructions stored in the memory sections DA1 through DA16 will be described hereinafter with reference to the FIGS. 4(a) through 4(d). For the sake of clarity, the memory address composed of eight bits A0 through A7 is described in the form of MAn+m, where MAn indicates the upper four bits A0 through A3, and m indicates the lower four bits A4 through A7. For example, MA1+2 indicates 0001 00010.

1. DA1 (TNA)

The memory section DA1 corresponding to the command word TNA contains the microcontrol instructions to output the control signals at the following memory addresses: ISR at MA1+2; SEL=IOB at MA1+4; OFAF and PC+1 at MA1+6; PC+1 at MA1+7; and CLEAR at MA1+8.

2. DA2 (TNO)

The memory section DA2 corresponding to the command word TNO contains the microcontrol instructions to output the control signals at the following memory addresses: ISR at MA2+2; SEL=IOB at MA2+4; PC+1 at MA2+6; ONOF and PC+1 at MA2+7; and CLEAR at MA2+8.

3. DA3 (TNE)

Similar to FIG. 4(b), the memory section DA3 corresponding to the command word TNE contains the microcontrol instructions so that the control signals are output at the following memory addresses: ISR at MA3+2; SEL=IOB at MA3+4; SEL+OTF at MA3+6; OFOF, PC+1 and CLEAR at MA3+7; OFAF and PC+1 at MA3+8; OFOF and PC+1 at MA3+9; and CLEAR at MA3+10.

4. DA7 (YON)

In the memory section DA7 corresponding to the command word YON, the control signals are output at the following memory addresses: ISR at MA7+2; SEL=ATF at MA7+4; SOF, ONAF and OFOF at MA7+6; SON, ONAF and OFOF at MA7+7; and PC+1 and CLEAR at MA7+8.

Figure 5:
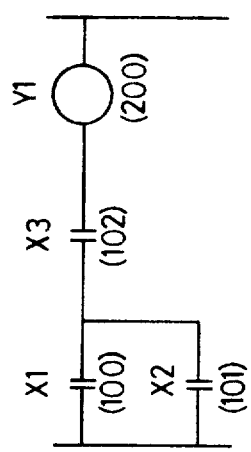
FIG. 5 is a circuit diagram of one example of a ladder diagram of a relay logic circuit.

FIG. 5 shows an example of a relay circuit which comprises input elements X1, X2 and X3 with I/O addresses 100, 101 and 102 and an output element Y1 with an I/O address 200.

Figure 6:
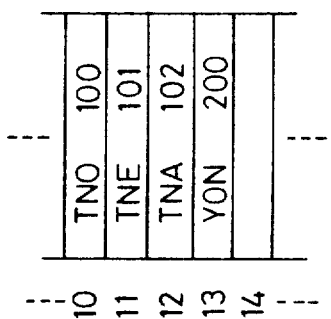
FIG. 6 is a representation of a portion of a sequence program memory shown in FIG. 1, which stores a sequence program corresponding to the relay logic circuit shown in FIG. 5.

FIG. 6 shows a portion of the sequence program memory 10 which stores at the memory addresses 10 through 14 sequence instructions corresponding to the relay circuit shown in FIG. 5. These sequence instructions TNO 100 through YON 200 are encoded into a 16-bit binary code having the 4-bit operation code and the 12-bit operand to be stored in the sequence program memory 10.

The operation of the programmable sequence controller according to the present invention will be described hereinafter. At the start of operation, the register 12 generates and applies the operation code 0001 to the upper four bits A0 through A3, so that the memory section DA1 corresponding to the command word TNA is selected. The counter 21 is reset, so that the address bits A4, A5 and A6 indicate 000. The pipeline register 25 is also reset, so that the signal "0" is applied to the final bit A7 from the data selector 23. Accordingly, the memory address MA1+0 (0001 0000) shown in FIG. 4(a) is designated at the start of operation. In this connection, the test flag ATF is set and the test flag OTF is reset at the start of operation.

Thereafter, the memory address MA1+2 is designated synchronously with the increment of the counter 21 so that the microinstruction having the control signal ISR is output. Then, in response to the control signal ISR, the sequence instruction which is designated by the program counter 11 is read out from the sequence program memory 10 and is stored in the register 12.

Since the 4-bit operation code of the sequence instruction is applied from the register 12 to the upper four bits A0 through A3, the memory address is altered from MA1+2 to MAn+4 at the next increment of the counter 21, where MAn is the 4-bit operation code of the read-out sequence instruction. Then the microinstructions are continuously read out to execute the sequence control operations. This sequence is shown by arrows in FIG. 3(a).

After the sequence control operation corresponding to one command word is completed, the counter 21 is caused to be reset, so that the memory address is returned to the first address (MAn+0). Subsequently, the next sequence instruction is read out in response to the control signal ISR resulting in the change of the memory section. Then, the sequence control operation is executed. This sequence is shown by arrows in FIG. 3(b), wherein the sequence starts from an arrow AR.

The details of the operation will be described hereinafter by way of the example of the sequence instructions shown in FIG. 6. As mentioned above, at the first stage, the memory address MA1+0 is designated, and the flip-flops ATF and OTF are set and reset, respectively. Subsequently, when the counter 21 is incremented by one count synchronously with the clock pulse from the clock generating signal 22, the memory address MA1+2 is designated because the data selector 23 still applies the signal "0" to the final bit A7. As a result, the control signal ISR is output and applied to the program counter 11. If it is assumed that the content of the program counter 11 is 10, the sequence instruction TNO 100 which is stored at the memory address 10 of the sequence program memory 10 is read out therefrom so as to be stored in the register 12 in response to the control signal ISR. The 4-bit operation code 0010 and the 12-bit operand 0000 0110 0100 of the sequence instruction TNO 100 are immediately applied to the upper four bits A0 through A3 of the microprogram memory 20 and the input and output circuit section 15, respectively.

After that, upon the next increment of the counter 21, the designated memory address is altered from MA1+2 (0001 0010) to MA2+4 (0010 0100) because the signal "0" is still applied to the final bit A7. Therefore, the data selection signal SEL=IOB is output to the data selector 23 through the pipeline register 25 thereby to check the ON/OFF state IOB of the input element X1 which is designated by the 12-bit operand of the sequence instruction TNO 100.

If the input element X1 indicates the OFF state (IOB=0), the signal "0" is applied to the final bit A7 from the data selector 23. Accordingly, when the counter 21 is incremented by one count, the memory address advances to MA2+6 from MA2+4, so that the control signal PC+1 is output thereby to cause the program counter 11 to be incremented by one count from 10 to 11. If the input element X1 indicates the ON state (IOB=1), the signal "1" is applied to the final bit A7. Therefore, upon the next increment of the counter 21, the memory address is changed from MA2+4 (0010 0100) to MA2+7 (0010 0111), so that the control signals ONOF and PC+1 are output. As a result, the test flag OTF is set and the content of the program counter 11 is incremented from 10 to 11, while the test flag ATF is set.

When the counter 21 is further incremented by one count, the memory address advances to MA2+8 in either case because the signal "0" is applied to the final bit A7 from the data selector 23 with no data selection signal SEL being output thereto. As a result, the control signal CLEAR is output thereby to reset the counter 21.

Accordingly, after the execution of the sequence control operation corresponding to the command word TNO, the test flag OTF is set and reset when the designated input element indicates the ON state and OFF state, respectively. This allows the test flag OTF to store the test result of the designated input element.

When the counter 21 is reset by the control signal CLEAR, the memory address is altered from MA2+8 to MA2+0. After that, in response to the increment of the count 21, the memory address MA2+2 is designated and the control signal ISR is output. As a result, the next sequence instruction TNE 101 designated by the program counter 11 is read out from the sequence program memory 10 so as to be stored in the register 12. At the same time, the operation code 0011 and the operand of the sequence instruction TNE 101 are applied to the upper bits A0 through A3 and the input and output circuit section 15, respectively.

Upon the next increment of the counter 21, the memory address is altered from MA2+2 to MA3+4 because the 4-bit operation code 0011 is applied to the upper four bits A0 through A3. Therefore, the data selection signal SEL=IOB is output thereby to check whether the input element X2 designated by the operand of the sequence instruction TNE 101 indicates the ON state or the OFF state. If it is ON (IOB=1), the signal "1" is output to the final bit A7 so that the memory address advances from MA3+4 to MA3+7 resulting in outputting the control signals OFOF, PC+1 and CLEAR. Therefore, the test flag OTF is caused to be reset, the content of the program counter 11 is altered from 11 to 12, and the counter 21 is reset, while the test flag ATF is maintained to be set. It is to be noted that, in the case that the designated input element indicates the ON state, it is not necessary to check whether the test flag OTF has been set or reset, because the ON state of the input element causes the OR circuit, which includes the command words TNO and TNE, to be satisfied irrespective of the OFF state of the other input elements.

If, however, the designated input element X2 indicates the OFF state (IOB=0), the memory address advances from MA3+4 to MA3+6 thereby to output the data selection signal SEL=OTF to the data selector 23. As a result, it is checked whether the test flag OTF has been set or reset. If it has been reset (OTF=0), the memory address is altered from MA3+6 to MA3+8 thereby to output the control signals OFAF and PC+1. Therefore, the test flag ATF is caused to be reset and the content of the program counter 11 is incremented from 11 to 12. If the test flag OTF has been set (OTF=1), the memory address is advanced from MA3+6 to MA3+9, so that the test flag OTF is caused to be reset by the control data OFOF and the content of the program counter 11 is incremented from 11 to 12 by the control data PC+1. After that, upon the next increment of the counter 21, the memory address advances to MA3+10 from MA3+8 or MA3+9, resulting in resetting the counter 21 by the control signal CLEAR.

Accordingly, after the execution of the sequence control operation corresponding to the command word TNE, the non-satisfaction of the OR circuit is memorized by resetting the test flag ATF and, otherwise, the test flag ATF is maintained set.

Subsequently, the memory section DA1 is selected by the operation code 0001 of the next sequence instruction TNA 102 in a manner similar to the executions of the command words TNO and TNE. If the designated input element X3 indicates the OFF state (IOB=0), the memory address advances from MA1+4 to MA1+6 thereby to reset the test flag ATF by the control signal OFAF and to increment the content of the program counter 11 from 12 to 13. If, however, the designated input element X3 indicates the ON state (IOB=1), the memory address MA1+7 is designated thereby to increment the content of the program counter 11 from 12 to 13, while the test flag ATF is maintained set. After that, upon the next increment of the counter 21, the counter 21 is caused to be reset in either case by the control signal CLEAR.

Subsequently, the memory section DA7 is selected by the operation code 0111 of the next sequence instruction YON 200. When the memory address MA7+4 is designated, the data selection signal SEL=ATF is output to check whether the test flag ATF has been set or reset. If it is reset (ATF=0), the memory address advances from MA7+4 to MA7+6 thereby to output the control signals SOF, ONAF and OFOF. As a result, the output element Y1 designated by the 12-bit operand of the sequence instruction YON 200 is caused to be de-energized, the test flag ATF is set, and the test flag OTF is reset. If, however, the test flag ATF is set, the memory address MA7+7 is designated so that the control signals SON, ONAF and OFOF are output. Therefore, the designated output element Y1 is energized, the test flag ATF is set, and the test flag OTF is reset.

Subsequently, the memory address advances from MA7+6 or MA7+7 to MA7+8 thereby to increment the content of the program counter 11 by one count and to reset the counter 21.

Accordingly, the sequence control operations in accordance with the sequence instructions shown in FIG.

6 are carried out by reading out the microinstructions from various memory addresses.

Figure 7:
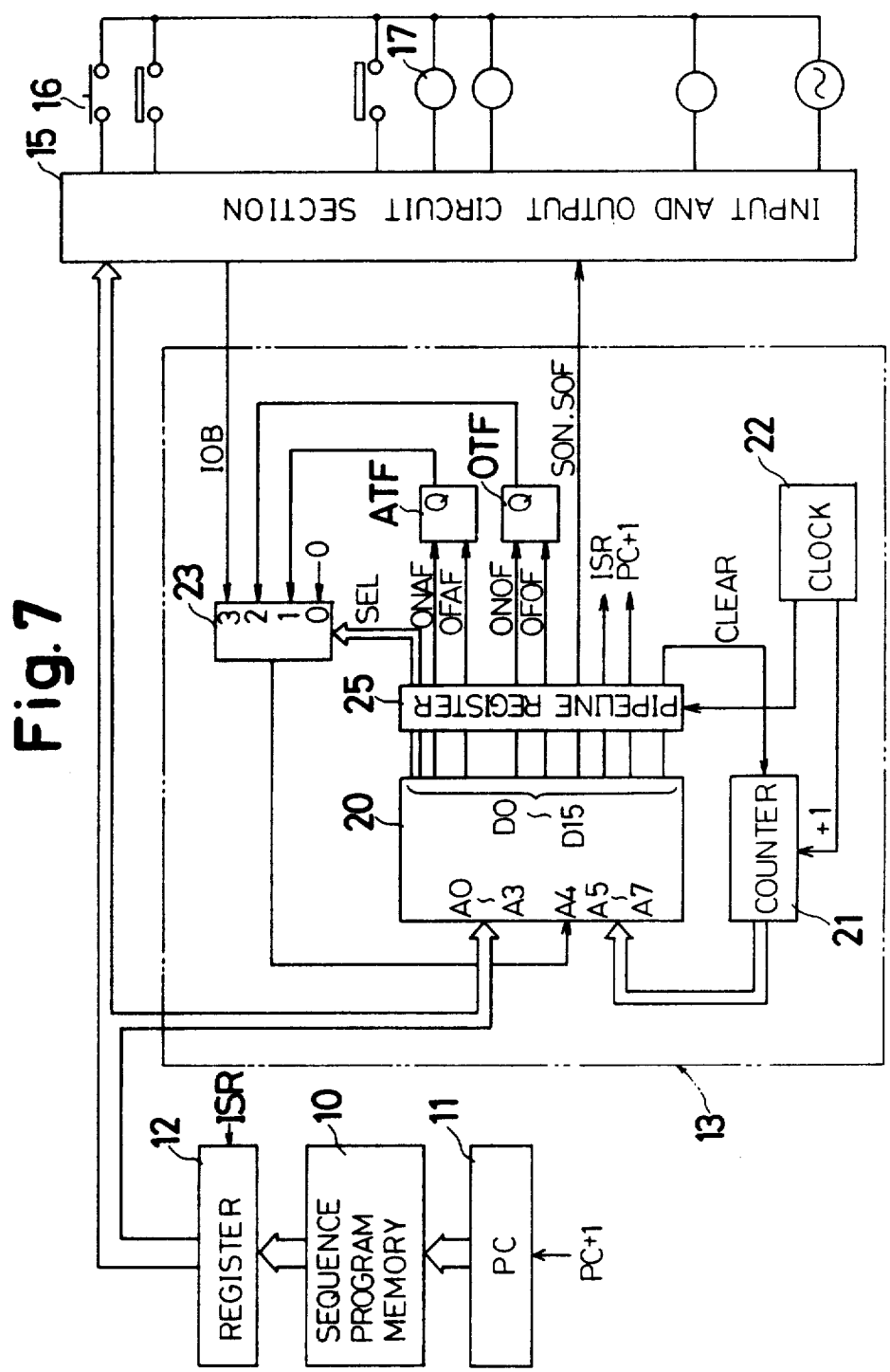
FIG. 7 is a block diagram showing a second embodiment of the present invention.
Figure 8D:
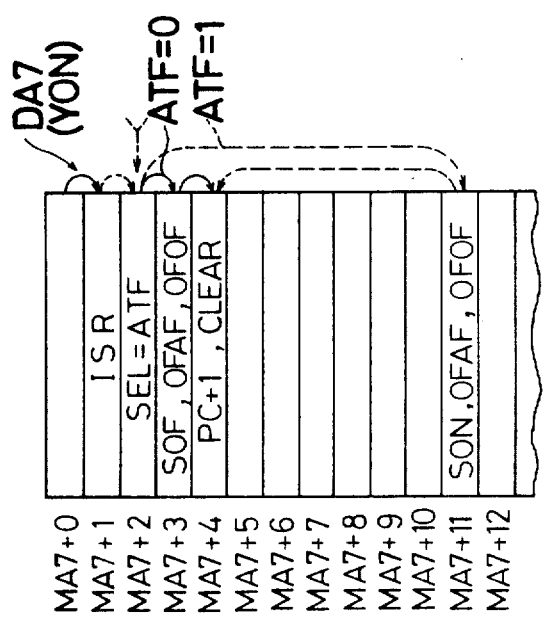
Figure 8C:
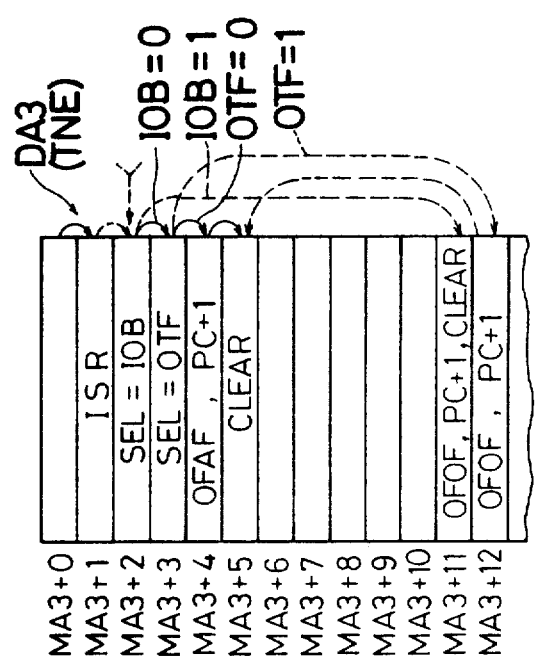
Figure 9:
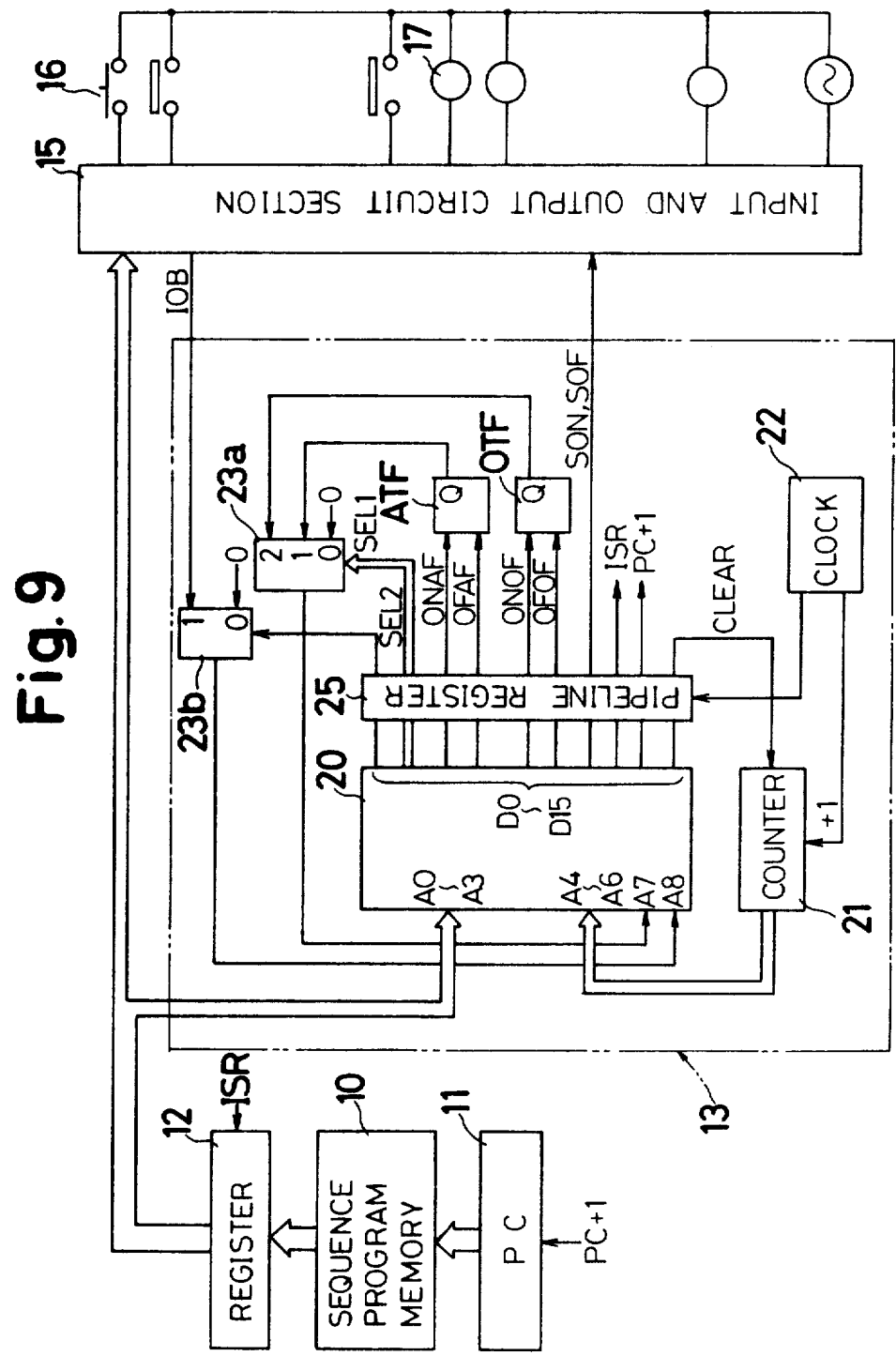
FIG. 9 is a block diagram showing a third embodiment of the present invention.

FIG. 7 shows a second embodiment according to the present invention, in which the fourth bit A4 of the memory address is decided by the signal from the data selector 23, and the lower three bits A5 through A7 are decided by the counter 21.

FIGS. 8(a) through 8(d) show the memory sections DA1, DA2, DA3 and DA7 which are used in this embodiment. The remaining elements are identical with those of the first embodiment shown in FIGS. 1, 2, 3(a) and 3(b).

The memory section DA1 shown in FIG. 8(a) is nextly explained. If the designated input element indicates the OFF state (IOB=0), the memory address advances from MA1+2 to MA1+3 in response to the increment of the counter 21. After that, the memory address MA1+4 is designated at the next increment of the counter 21. If, however, the designated input element indicates the ON state (IOB=1), the memory address is altered from MA1+2 to MA1+11 because the signal "1" is applied to the fourth bit A4 of the microprogram memory 20. After that, in response to the increment of the counter 21, the memory address is altered from MA1+11 to MA1+4 thereby to clear the counter 21, because the signal "0" is applied to the fourth bit A4.

Accordingly, the signal from the data selector 23 can be applied to the fourth bit A4 instead of the final bit A7 of the memory address as in the first embodiment.

FIGS. 9 and 10(a) through 10(d) show a third embodiment according to the present invention, wherein two data selectors 23a and 23b are provided instead of the data selector 23 shown in FIG. 1. In this embodiment, the microprogram memory 20 has a capacity to store up to 512 16-bit words. The first bit D0 of the microinstruction is employed to output a data selection signal SEL2 to the data selector 23b so as to check the ON/OFF state of the designated input element, and the following two bits D1 and D2 thereof are employed to output a data selection signal SEL1 to the data selector 23a so as to check whether the test flags ATF and OTF are set or reset. Since the microprogram memory 20 has 512 memory areas each of which can store a 16-bit microcontrol instruction, the memory address thereof is composed of nine bits A0 through A8. The three bits A4 through A6 of the memory address are decided by the counter 21, and the seventh and eighth bits A7 and A8 thereof are decided by signals from the data selectors 23a and 23b, respectively.

FIGS. 10(a) through 10(d) show the memory sections DA1, DA2, DA3 and DA7 used in the third embodiment. As the counter 21 is incremented, the memory address advances from MA1+0 to MA1+4 and then to MA1+8. When the memory address MA1+8 is designated, the control signals SEL1=ATF and SEL2=IOB are output thereby to check the status of the test flag ATF and to check the ON/OFF state of the input element designated by the operand of the sequence instruction. Since the bits A7 and A8 are decided by the signals from the data selectors 23a and 23b, the memory address advances from MA1+8 to one of MA1+12, MA1+13, MA1+14 and MA1+15 depending on the ON/OFF state of the designated input element and the status of the test flag ATF.

The elements constituting the processing unit 13 according to the present invention can be constructed from various IC units manufactured by Texas Instruments Incorporated, Dallas, Tex., as follows: the microprogram memory 20 from two interconnected 256×8 ROM, SN74LS271; the counter 21 from SN74LS197; the data selectors 23, 23a and 23b from SN74LS253; the pipeline register 25 from SN74LS374; and the test flags ATF and OTF from SN74LS279.

As mentioned above, according to the present invention, the memory address of the microprogram memory 20 is decided by the operation code of a sequence instruction to be executed, the ON/OFF state of the input element designated by the sequence instruction and the counter 21. Accordingly, it is accomplished to read out a desired microinstruction from the microprogram memory 20 with the provision of a data selector and a counter. Further, according to the present invention, the construction of the processing unit 13 is simple so that the sequence controller can be built inexpensively, and it is not necessary to use an expensive general-purpose central processing unit (CPU) or a microprogram control unit (MCU).

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A programmable sequence controller comprising:
   instruction generating means for successively and cyclically generating a plurality of sequence instructions each composed of an operation code for designating a type of instruction and an operand for designating one of input and output elements;
   an I/O circuit section connected to said input and output elements and responsive to said operand of each generated sequence instruction for selecting one of said input and output elements;
   a microprogram memory having a plurality of memory sections, address input terminals and signal output terminals, each of said memory sections comprising a plurality of memory addresses for respectively storing microinstructions;
   a counter;
   counter control means connected to said counter for successively incrementing the content of said counter;
   test flag means responsive to signals output from a first part of said signal output terminals for temporarily storing the result of a test on the ON-OFF state of at least one of said input and output elements;
   first line means for applying said operation code from said instruction generating means to a first part of said address input terminals so as to select one of said memory sections;
   second line means for applying the content of said counter to a second part of said address input terminals;
   third line means for applying the status of said test flag means and the ON-OFF state of one of said input and output elements selected by said I/O circuit section, to a third part of said address input terminals, said second and third line means enabling said microprogram memory to select one of said memory addresses composing a selected one of said memory stations;

fourth line means for applying a signal from a second part of said signal output terminals to said counter so as to reset the same; and fifth line means for applying a signal from a third part of said signal output terminals to said I/O circuit section so as to energize or deenergize one of said output elements selected by said I/O circuit section.

2. A programmable sequence controller as set forth in claim 1, wherein:

said memory sections respectively correspond to types of said operation codes generated from said instruction generating means and store respective sets of microinstructions depending upon the types of said operation codes.

3. A programmable sequence controller as set forth in claim 2, wherein:

the set of said microinstructions stored in each of said memory sections includes as a final microinstruction thereof a reset command for applying said signal through said fourth line means to said counter so as to reset the same.

4. A programmable sequence controller as set forth in claim 3, wherein said test flag means comprises:

a first test flag for storing the result of AND tests on the ON-OFF states of said input and output elements during the execution of a number of said sequence instructions; and a second test flag for storing the result of OR tests on the ON-OFF states of said input and output elements during the execution of a number of said sequence instructions.

5. A programmable sequence controller as set forth in claim 4, wherein said third line means includes:

a signal selector responsive to signals output from a fourth-part of said signal output terminals for selectively applying the status of said first and second test flag and the ON-OFF state of one of said input and output elements selected by said I/O circuit section, to said third part of said address input terminals.

6. A programmable sequence controller as set forth in claim 4, wherein said third line means includes:

a first signal selector responsive to signals output from a fourth part of said signal output terminals for selectively applying the statuses of said first and second test flags to said third part of said address input terminals; and a second signal selector responsive to a signal output from a fifth part of said signal output terminals for selectively applying the ON-OFF state of one of said input and output elements selected by said I/O circuit section, to a fourth part of said address input terminals.

7. A programmable sequence controller as set forth in claim 1, wherein said instruction generating means comprises:

a sequence program memory having a plurality of memory addresses for storing said sequence instructions; and another counter connected to said sequence program memory and capable of incrementing its content in response to a signal output from a fourth part of said signal output terminals for successively and selectively designating said memory addresses for which said sequence instructions are to be read out.

* * * * *